May 10, 1949.    E. A. SMITH    2,469,998
COMPRESSOR
Filed Sept. 6, 1946
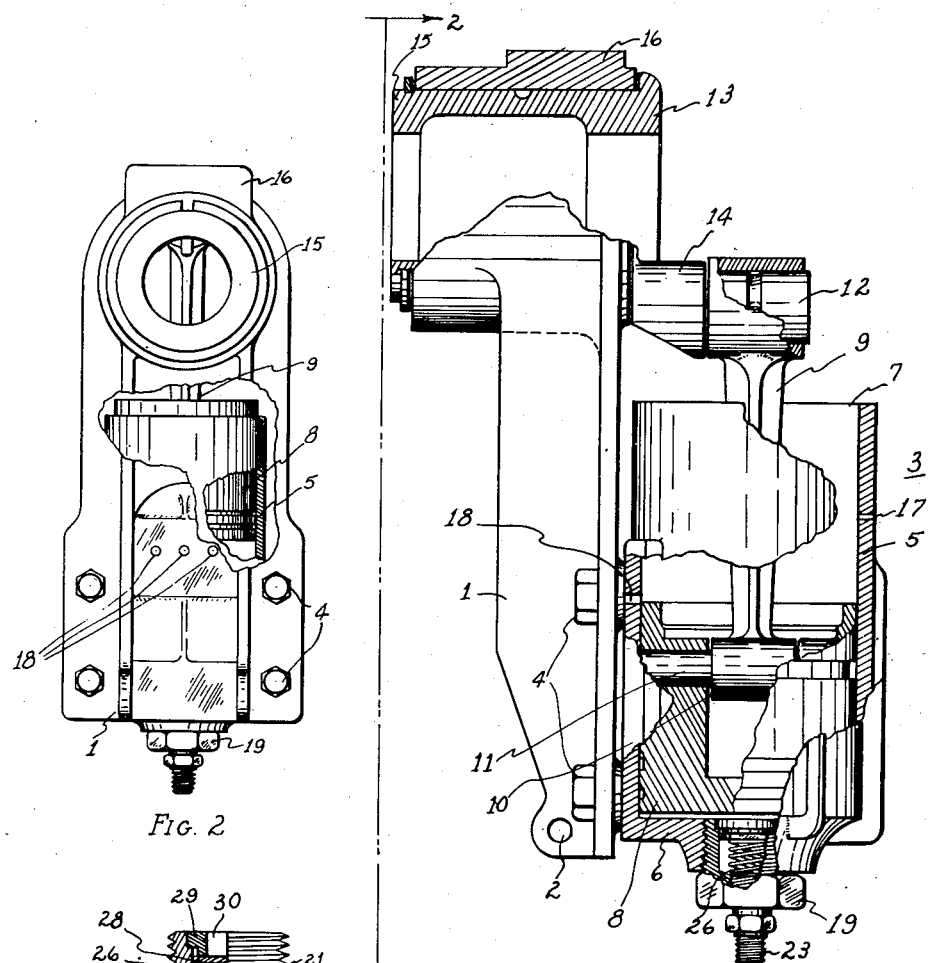
FIG. 1
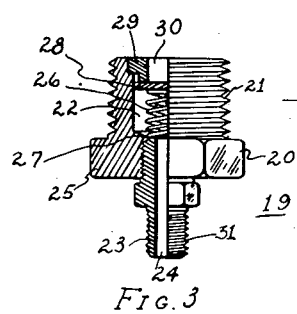
FIG. 2
FIG. 3
FIG. 4
INVENTOR.
EDWIN A. SMITH
BY Benedict & Swartwood
ATTORNEYS Patented May 10, 1949

2,469,998

UNITED STATES PATENT OFFICE 2,469,998

COMPRESSOR

Edwin A. Smith, Danville, Ill., assignor to Willard-Anderson Company, Danville, Ill., a company wholly owned by William A. Anderson Application September 6, 1946, Serial No. 695,122

1 Claim. (Cl. 230—235)

This invention relates to a pump and more particularly to a pump for pumping or compressing gases in an efficient and economical manner.

It is especially an object of this invention to provide an improved economical compressor for farm use and particularly for use as a tractor pump for filling tractor tires with air.

It is another object of this invention to provide a simple compressor which can be driven by the power take-off of the tractor.

Compressors for use on a farm and in connection with tractor tires must be cheap, simple and fool proof. For example, intake valves tend to stick and clog up but in my device I use no intake valves. As long as the piston can move up and down, the air will be taken into the cylinder of the compressor during the suction stroke of the piston. I accomplish this by placing a number of holes in a cylinder wall such that there is open communication with the interior of the cylinder when the piston is at its maximum suction stroke. Such intake holes are immediately covered by the piston upon the discharge stroke of the piston, thereby sealing the cylinder from the air. Simplicity in operation is one of the main features of my compressor.

It is also an object of my invention to provide an improved discharge valve which is also simple in its operation and minimizes all sticking tendencies.

Other objects, advantages and uses of my invention will become apparent from referring to the drawings in which Fig. 1 is a side elevation partly in cross section of the pump assembly. Fig. 2 is an end elevation of smaller scale than the elevation of Fig. 1 and is a view of Fig. 1 along the lines 2—2. Fig. 2 is also partly in cross section. Fig. 3 is a detailed view of the discharge valve partly in cross section. Fig. 1 shows the piston at its maximum discharge stroke and Fig. 2 shows the piston in the position of its maximum intake stroke. Figure 4 is a detail of the cap 28 shown in Fig. 3.

Referring to Fig. 1, a supporting frame 1 is provided which may be fastened to any suitable support by means of bolts placed through bolt-hole openings such as openings 2. The cylinder and piston assembly 3 is bolted on to the support 1 by means of the bolts 4. The cylinder 5 is closed at the end 6 and open at the end 7. A piston 8 is arranged in the cylinder for reciprocation therein. A connecting rod 9 has the shank 10 journalled on the axis 11 which is firmly attached flushwise in the walls of the piston 8 as shown in Fig. 1. The other end of the connecting rod 11 is journalled about the shaft portion 12 of the crank 13. The shoulder portion 14 of crank 13 is attached to the sleeve portion 15 of the crank. The sleeve portion 15 rotates and is journalled in the bearing portion 16 of the support 1. Referring to Fig. 1 an opening 17 is provided for lubrication. A rod not shown, driven by suitable means may be inserted into the sleeve 15 to provide the means for rotating the crank thereby reciprocating the piston in the cylinder.

An important feature of my invention is the avoidance of any intake valves. In compressors of this type which are used around the farm, intake valves tend to become clogged with dirt and the like which makes it highly undesirable to use conventional intake valves. For an all-purpose compressor intake valves are unnecessary and undesirable. I have, therefore, provided a plurality of openings 18 which are particularly shown in Fig. 2. These openings are positioned in the side wall of the cylinder such that they are below the leading edge of the piston 8 when the piston 8 begins its downward or discharge stroke. Thus, when the piston is in a position shown in Fig. 2 air has entered through openings 18 and filled the void within the cylinder. On the downward stroke of the piston, air is discharged through the discharge valve 19.

The discharge valve 19 is better shown in Fig. 3. The valve 19 comprises a body portion 20 having a threaded connection 21 which is screwed into the bottom of the cylinder such that it is flush with the inside wall of the bottom of the cylinder. Opening 22 extends lengthwise through the valve body. A connector fitting 23 is provided which has an opening 24 therethrough which screws into the head portion 25 of the valve 19 and is screwed in so that it is flush with the interior opening 22 of the valve body. The other end 31 of the connector fitting 23 provides a means for attaching a discharge hose. A spring 26 is provided which rests in the valve at one end at point 27. The fitting 23 provides the support for the spring 26. The spring provides the support and valve sealing means for the cap 28 which rides on top of the spring 26. The spring 26 is held under compression by means of the shoulder washer 29 which is pressed into the opening 22 thereby becoming firmly attached therein as shown.

On the downward stroke of the piston the cap 28 is forced downwardly on the spring 26 permitting free passage of air through the openings 22 and 24. The fitting 23 may be connected to the suitable storage tank which is used in connection with the air compressor. On the upward stroke of the piston a vacuum is created within the cylinder and the spring 26 urges the floating cap member 28 against the seat provided by the shoulder washer 29, therefore providing seating means for the valve during the suction stroke. The floating cap or sealing member 28 must be of hexagon or similar shape as shown in Fig. 4 so that when the cap is depressed away from the shoulder washer 29 the air will freely enter into the opening 22. All that is really necessary is that the cap member 28 be smaller than the interior diameter of the opening 22 but larger than the opening 30 in the shoulder washer 29 in order that the valve will be properly sealed or closed during the intake stroke.

I claim as my invention:

In a compressor a cylinder, a piston and a discharge valve, said cylinder having side walls and having one end closed and one end open, means for reciprocating the piston in said cylinder, said piston further adapted and arranged such that said piston approaches the open end of said cylinder during the intake stroke, said walls of said cylinder having a plurality of intake ports therein, said ports adapted and arranged to be in open communication with said cylinder when said piston is at its maximum intake stroke and said ports being further adapted and arranged to be immediately closed by said piston when said piston begins its discharge stroke, and a vertical support, said cylinder removably attached to said support near one end thereof, the other end of said support comprising a sleeve bearing, a rotatable crank journalled in said sleeve bearing, a connecting rod rotatably attached to said crank at one end and rotatably attached to said piston at the other end, a discharge valve suitable for use in a compressor comprising a body, said body comprising a threaded portion and a head portion, said threaded portion adapted and arranged to be screwed into one wall of the cylinder of a compressor, said body having an opening extending lengthwise therethrough, the portion of the opening through the head of said body being threaded, a connector fitting threaded on both ends also having an opening therethrough, said fitting screwed into the threads in the opening in the head of said valve such that it is flush therein, said other end of said fitting arranged to be attached to a suitable hose connection, said opening through said threaded portion of said body being larger than the opening through said fitting, said opening at the end opposite the threaded connector being larger thereby forming a shoulder therein, a spring in said opening through said threaded portion of said body abutting against said connector, a cap abutting against the other end of said spring, said cap being smaller in cross-section than the opening through said threaded section of said body, a shoulder washer placed into said opening in said threaded portion of said body and onto the shoulder portion in said opening thereby maintaining said spring under compression, said cap being larger in cross-section than the opening through said shoulder washer, said valve being sealed during the suction stroke of the piston of the compressor by the urging of said cap against said shoulder washer by said spring, and said valve adapted and arranged to discharge compressed gas therethrough when said cap is urged away from said shoulder washer during the discharge stroke of said piston.

EDWIN A. SMITH.

REFERENCES CITED

The following references are of record in the file of this patent:

UNITED STATES PATENTS

| Number | Name | Date |
| --- | --- | --- |
| 1,150,977 | Strickland | Aug. 24, 1915 |
| 1,315,256 | Strickland | Sept. 9, 1919 |